United States Patent [19]
Freeman

[11] 3,878,618
[45] Apr. 22, 1975

[54] LEVEL VIAL MOUNT
[75] Inventor: Philip Martin Freeman, Simsbury, Conn.
[73] Assignee: The Stanley Works, New Britain, Conn.
[22] Filed: Jan. 22, 1974
[21] Appl. No.: 435,574

[52] U.S. Cl. .................................................. 33/379
[51] Int. Cl. ............................................ G01c 9/28
[58] Field of Search ............ 33/379, 381, 382, 383

[56] References Cited
UNITED STATES PATENTS
3,593,428   7/1971   Jacoff .................................. 33/379
3,738,015   6/1973   De Jorg .............................. 33/379

FOREIGN PATENTS OR APPLICATIONS
95,393   5/1963   Denmark ............................ 33/379
813,600   9/1951   Germany ............................ 33/379

*Primary Examiner*—Harry N. Haroian
*Assistant Examiner*—Charles E. Phillips
*Attorney, Agent, or Firm*—Prutzman, Hayes, Kalb & Chilton

[57] ABSTRACT

A cylindrical level vial is mounted in the web of a level frame through the use of a tapered projection received in a cylindrical projection at one end of the vial. An integrally formed cantilever mounted resilient clip on the other end of the vial engages the wall of a notch formed in the web to firmly mount the vial. The clip is provided with a groove closely receiving the web and has a tapered outer surface on its free end for wedging the vial into assembled position.

5 Claims, 4 Drawing Figures

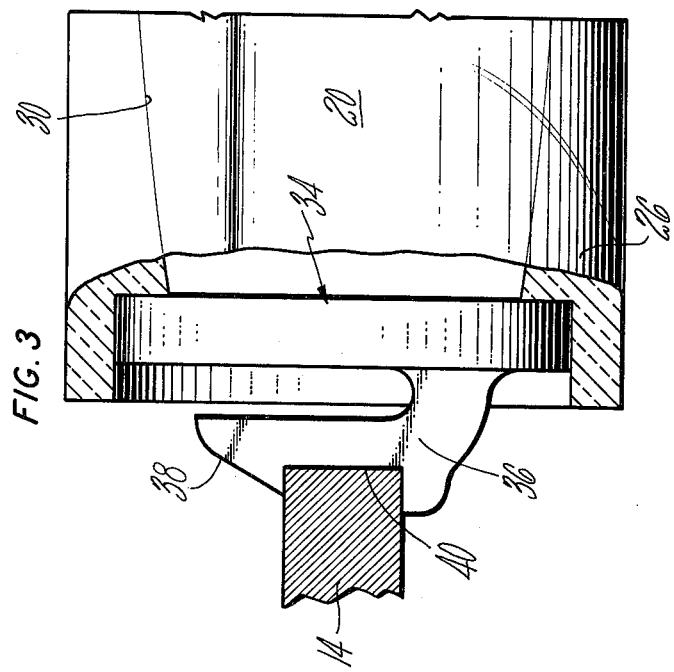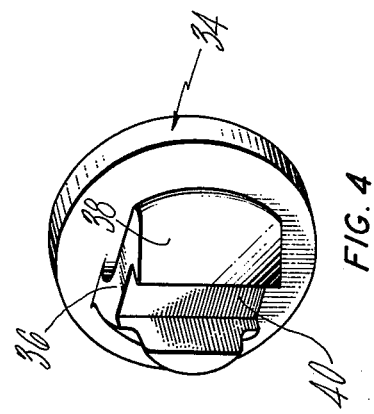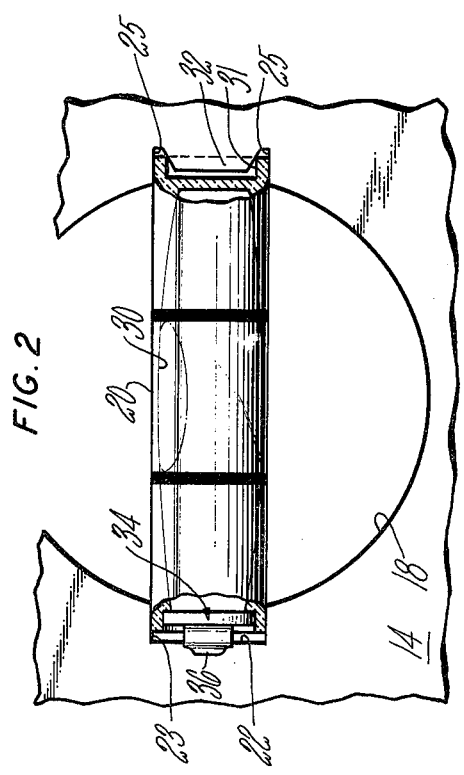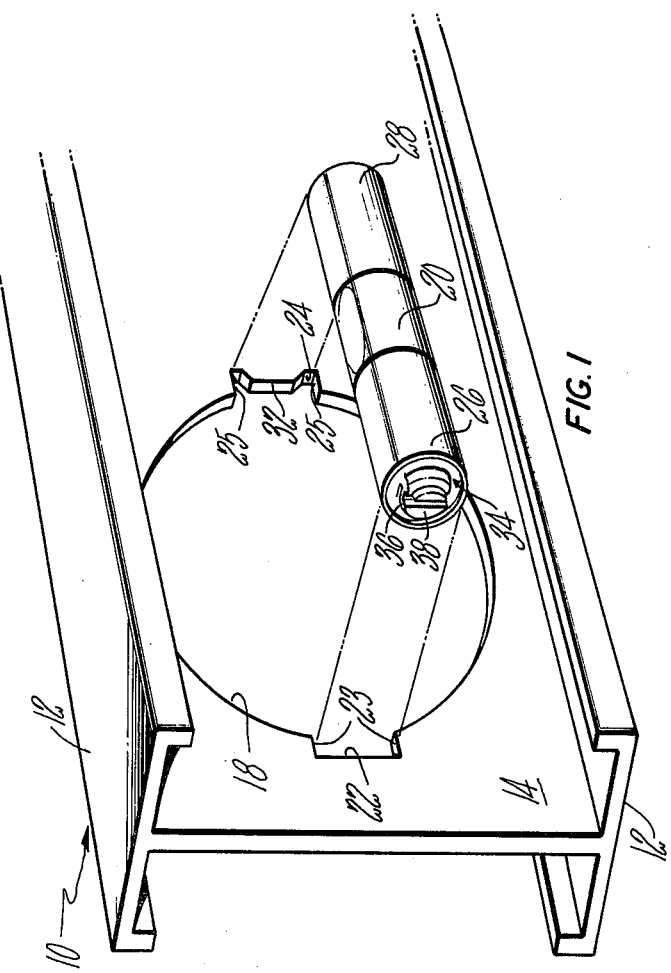

3,878,618

LEVEL VIAL MOUNT

BRIEF SUMMARY OF THE INVENTION

This invention relates to levels of the type used by carpenters, masons and other mechanics and is particularly concerned with improved vials for such levels and the manner of mounting such vials in a level.

A primary object of this invention is to provide an improved level having a vial which is easily and accurately assembled in the level frame by the simple expedient of inserting the vial into pre-arranged notches in the level frame without the need for additional parts or fabrication steps.

Another object of this invention is to provide an improved level vial of novel construction which is adapted for precision installation in a level frame without requiring supplementary attaching means or decorative parts.

Another object of this invention is the provision of an improved vial which includes a resilient integral snap-on latch for retaining the vial in its assembled position on the frame.

Other objects will be in part obvious and in part pointed out more in detail hereinafter.

A better understanding of the invention will be obtained from the following detailed description and the accompanying drawing of an illustrative application of the invention.

BRIEF DESCRIPTION OF THE DRAWINGS

In the Drawings

FIG. 1 is a partial exploded perspective view of a level embodying the present invention;

FIG. 2 is a partial front elevational view of the level of FIG. 1;

FIG. 3 is an enlarged fragmentary side view, partially broken away, illustrating the invention in greater detail; and FIG. 4 is a perspective view of an end cap of the vial of the present invention.

DESCRIPTION OF THE PREFERRED EMBODIMENT

Referring now to the drawings in greater detail, in which like numerals refer to like parts in the several figures, the level is provided with a frame 10 which is shown as having an I-beam configuration comprising parallel working flanges 12 connected by the central web 14. The frame may be formed of any suitable material and is preferably extruded from aluminum, magnesium, or an alloy thereof.

The web 14 is preferably formed with a plurality of longitudinally spaced circular apertures 18 (only one of which is shown in the drawing) to accommodate one or more level vials 20.

As shown in FIG. 1, each aperture 18 is provided with diametrically opposed pairs of notches 22, 24 to respectively receive the ends 26, 28 of vial 20 at a preselected angle relative to the parallel working flanges 12. The vial 20 is shown in the drawing as being disposed parallel to the working surfaces 12 although any other desired angle may be selected.

The notches 22, 24 are precision formed relative to the flanges 12 of the frame and the ends of the vial 20 are precision formed to the same dimensions as the notches. When so constructed, the vial 20 may be precisely and accurately aligned with the working flanges 12 of the frame when the vial is assembled in the frame with its longitudinal axis lying substantially coincident with the plane of the web 14 of the frame.

Preferably, and as illustrated, the vial 20 has a cylindrical outer surface and its cavity 30 within the vial is barrel-shaped and has a longitudinal axis coincident with the axis of the cylindrical outer surface of the vial 20. With such a construction, the rotative disposition of the vial relative to the frame does not affect the accuracy of the bubble cavity 30 relative to the working flanges 12. Also the side walls 23 and 25 of the notches 22 and 24 are parallel to each other so that axial movement of the vial within the notches does not affect the accuracy of mounting.

According to this invention, there is provided a novel mounting means for retaining the vial 20 mounted at the web 14. As shown in the drawings, this mounting means comprises means for maintaining the ends of the vial substantially in the plane of the web of the level frame. Referring specifically to FIG. 2, the outer cylindrical wall 30 of the vial extends beyond the end wall of the vial and the associated notch 24 of the web of the level frame is provided with truncated tapered projection 32, having a taper angle of, say, 60°, which is engaged with the inner surface of the cylindrical projection 31 of the cylindrical vial wall to secure one end of the vial in a coplanar position with the web 14 and to accommodate any manufacturing variations in the wall thickness of the vial. The other end of the vial is closed by a wall in the form of a cap member 34 having an integrally resilient clip, or latch, 36 cantilever mounted thereon. The cap member 34 is inserted in the end of the vial 20 to seal the same. The integral clip 36 protrudes beyond the end of the vial.

The vial is positively mounted in the frame by the simple expedient of inserting the projection 31 of the vial in the notch 25 with the projection 31 receiving the truncated projection 32 of the frame. The free end of the cantilever mounted latch is provided with a tapered end surface 38 so that the vial may be readily wedged into final assembled position by engagement between the surface 38 and the end wall of notch 22. The resiliency of the material forming the clip 36 provides a longitudinal biasing force holding the projection 31 on the opposite end of the vial tightly against the projection 32. The groove 40 of the latch 36 is centered on the longitudinal axis of the vial and is dimensioned to closely receive the web 14 of the level.

In the preferred embodiment, the caps are formed of a molded plastic material, such as an acrylic or a polycarbonate, to provide the necessary resilience and also to provide the stability to minimize permanent deformation as required for the firm mounting of the vial in the frame throughout its useful life.

Should it be desired to replace the vial, this may be accomplished by depressing the clip 36 of the vial to be replaced and by replacing a new vial in the level frame, an operation requiring no special skills or equipment.

From the foregoing, it is apparent that this invention provides a level having a snap fitted vial assembled on the frame of the level by an individual having no special skills and without requiring any additional means of attachment or adjustment of the vial relative to the frame after assembly. It is further apparent that this invention provides the design which accommodates the precision field replacement of a vial on a frame while at the same time providing a construction which is not susceptible to inadvertent disassembly during use.

As will be apparent to persons skilled in the art, various modifications, adaptations and variations of the foregoing specific disclosure can be made without departing from the teachings of the present invention.

I claim:

1. A level comprising a frame provided with parallel working surfaces and an interconnecting web, an aperture formed in the web and having a pair of oppositely directed notches for mounting a level vial at a preselected relationship relative to the working surfaces with the longitudinal axis of the vial parallel to the plane of the web, a cylindrical projection formed on one end of said vial, one of said notches providing a centrally disposed tapered projection received in said cylindrical projection, a wall closing the other end of said vial and being provided with an integrally formed resilient clip said clip being provided with a notch for spanning the web adjacent the other notch for securing the vial to the level frame.

2. The level of claim 1 wherein said wall comprises a cap and said clip is formed integrally with said cap.

3. The level of claim 2 wherein the clip is secured to the cap by a cantilever mounting.

4. The level of claim 3 wherein the free end surface of the cantilever mounted clip is tapered for wedging engagement with the end of the associated notch of the level during assembly.

5. For use in a level having a frame provided with a working surface and a web, a level vial comprising a body having a cylindrical outer surface, the body being formed with a closed bore defining a barrel shaped cavity formed coaxially with the cylindrical outer surface, the cylindrical outer surface extending beyond the wall closing the bore at one end of the vial to form a cylindrical projection, a second wall sealing the other end of said vial, said second wall having integrally formed thereon a resilient cantilever mounted clip having a groove for snugly receiving the web of the level when the vial is mounted by the web.

* * * * *